United States Patent
Pettitt et al.

(10) Patent No.: US 7,245,053 B2
(45) Date of Patent: Jul. 17, 2007

(54) METHOD TO INCREASE ACTUATOR TORQUE

(75) Inventors: Edward Douglas Pettitt, Burt, NY (US); Jeffrey Charles Kinmartin, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 105 days.

(21) Appl. No.: 11/158,654

(22) Filed: Jun. 22, 2005

(65) Prior Publication Data

US 2006/0290215 A1    Dec. 28, 2006

(51) Int. Cl.
*H02K 7/08* (2006.01)

(52) U.S. Cl. ........................ 310/90; 310/75 R
(58) Field of Classification Search ............... 310/90
See application file for complete search history.

(56) References Cited

U.S. PATENT DOCUMENTS

| | | | |
|---|---|---|---|
| 2,639,394 A | 5/1953 | Douglas | |
| 3,325,231 A | 6/1967 | Ono | |
| 3,873,066 A | 3/1975 | Opyrchal | |
| 4,227,104 A | 10/1980 | Hamman | |
| 4,240,683 A | 12/1980 | Crase | |
| 4,321,748 A * | 3/1982 | Ito | 29/596 |
| 4,361,194 A | 11/1982 | Chow et al. | |
| 4,652,781 A * | 3/1987 | Andrei-Alexandru et al. | 310/83 |
| 4,885,948 A | 12/1989 | Thrasher, Jr. et al. | |
| 4,968,910 A | 11/1990 | Meier et al. | |
| 5,015,897 A | 5/1991 | Inajaki et al. | |
| 5,087,847 A | 2/1992 | Giesbert et al. | |
| 5,144,738 A * | 9/1992 | Oyafuso | 29/596 |
| 5,325,736 A | 7/1994 | Tsujita | |
| 5,644,180 A | 7/1997 | Buchanan, Jr. | |
| 5,872,412 A * | 2/1999 | Mita et al. | 310/83 |
| 6,000,292 A | 12/1999 | Najai et al. | |
| 6,069,768 A | 5/2000 | Heine et al. | |
| 6,166,463 A | 12/2000 | Woodward, Jr. | |
| 6,288,464 B1 | 9/2001 | Torii et al. | |
| 6,317,287 B1 | 11/2001 | Yano et al. | |
| 6,404,087 B1 | 6/2002 | Ichiyama | |
| 6,430,145 B1 | 8/2002 | Morimoto et al. | |
| 6,449,950 B1 | 9/2002 | Allen et al. | |
| 6,491,131 B1 | 12/2002 | Appleyard | |
| 6,698,933 B2 | 3/2004 | Lace | |

* cited by examiner

*Primary Examiner*—Burton Mullins
(74) *Attorney, Agent, or Firm*—Patrick M. Griffin

(57) ABSTRACT

The invention provides an electric motor assembly having an electric motor with a first end and a second end spaced from the first end. The electric motor also includes a motor shaft extending along a first axis between a first tip cantilevered from the second end and a second tip spaced from the first tip along the first axis. The electric motor assembly also includes a worm gear disposed on the motor shaft between the second end and the first tip for rotation with the motor shaft about the first axis. The electric motor assembly also includes a housing having an internal surface with a first portion correspondingly shaped with respect to the first end to locate the electric motor in the housing. The housing also includes a second portion disposed along the first axis spaced from the first tip. The electric motor assembly also includes a first thrust bearing disposed between the first tip and the second portion. The first thrust bearing limits movement of the motor shaft along the first axis in a first axial direction.

11 Claims, 3 Drawing Sheets ive designation. Also, to enhance consistency, features in any

METHOD TO INCREASE ACTUATOR TORQUE

FIELD OF THE INVENTION

The invention relates to an electric motor and more particularly to an apparatus supporting movement of a motor shaft of an electric motor.

BACKGROUND OF THE INVENTION

Electric motors often include a pair of thrust bearings to limit the movement of a motor shaft in an electric motor. One end of the motor shaft protrudes from the electric motor to communicate motion. The end of the motor shaft opposite the protruding end is often supported by a first thrust bearing that engages a tip of the shaft. The first thrust bearing limits the axial movement of the motor shaft in a first direction. A second thrust bearing often includes a first member fixed to the motor shaft and a second member fixed to a case of the electric motor. The first and second members contact one another when the motor shaft moves some predetermined distance in a second direction opposite the first direction. The first direction is away from the protruding end and the second direction is towards the protruding end. When the first and second members contact one another, the motor shaft is prevented from moving further in the second direction.

SUMMARY OF THE INVENTION

The invention provides an electric motor assembly having an electric motor with a first end and a second end spaced from the first end. The electric motor also includes a motor shaft extending along a first axis between a first tip cantilevered from the second end and a second tip spaced from the first tip along the first axis. The electric motor assembly also includes a worm gear disposed on the motor shaft between the second end and the first tip for rotation with the motor shaft about the first axis. The electric motor assembly also includes a housing having an internal surface with a first portion correspondingly shaped with respect to the first end to locate the electric motor in the housing. The housing also includes a second portion disposed along the first axis spaced from the first tip. The electric motor assembly also includes a first thrust bearing disposed between the first tip and the second portion. The first thrust bearing limits movement of the motor shaft along the first axis in a first axial direction.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
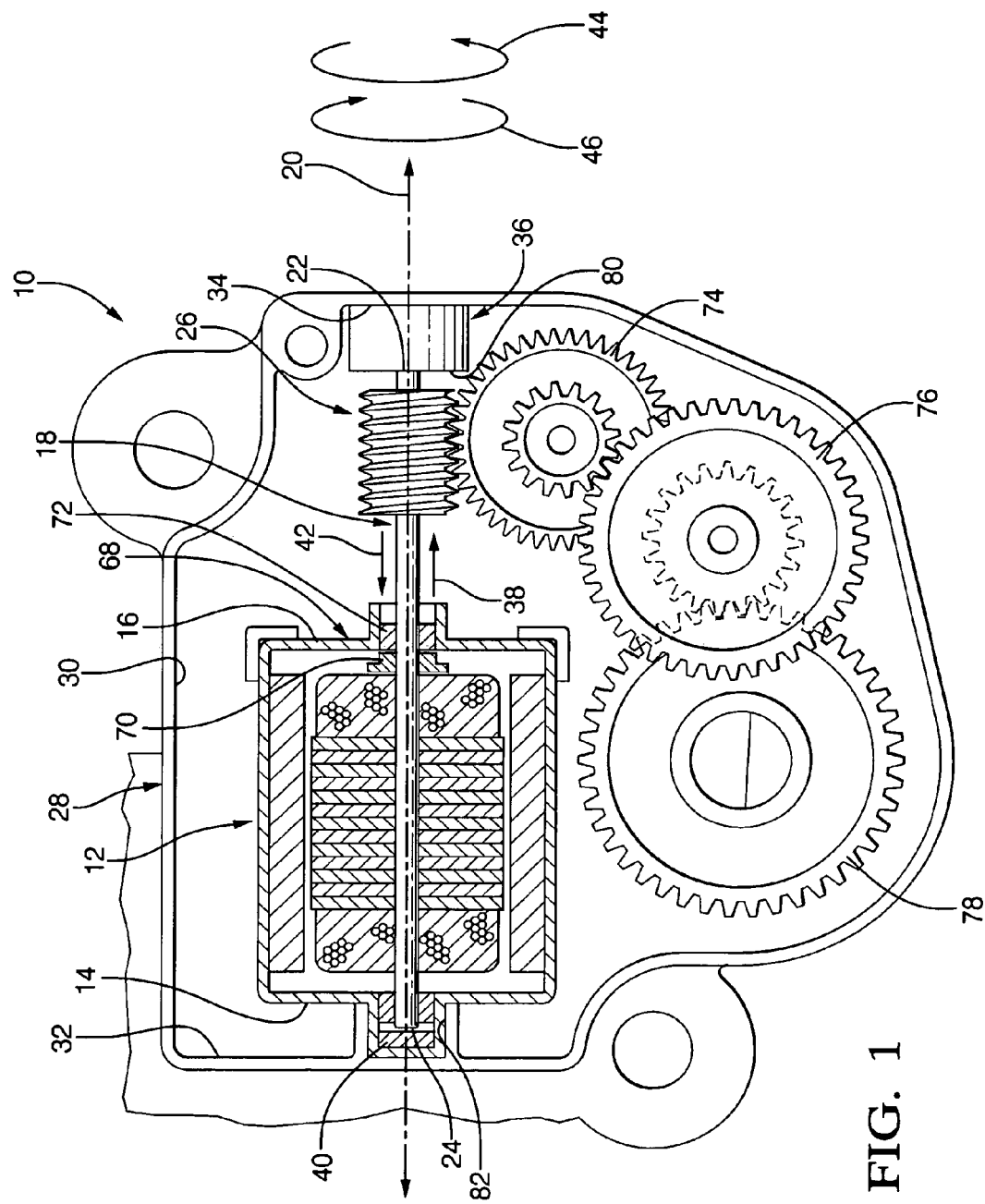
FIG. 1 is a schematic cross-sectional view of a first exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is only shown in one embodiment. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIG. 1, in a first exemplary embodiment of the invention, an electric motor assembly 10 includes an electric motor 12 having a first end 14 and a second end 16 spaced from the first end 14. The electric motor 12 also includes a motor shaft 18 extending along a first axis 20 between a first tip 22 cantilevered from the second end 16 and a second tip 24 spaced from the first tip 22 along the first axis 20. A worm gear 26 is disposed on the motor shaft 18 between the second end 16 and the first tip 22 for rotation with the motor shaft 18 about the first axis 20. The electric motor assembly 10 also includes a housing 28 having an internal surface 30 with a first portion 32 correspondingly shaped with respect to the first end 14 to locate the electric motor 12 in the housing 28 and also having a second portion 34 disposed along the first axis 20 spaced from the first tip 22. The electric motor assembly 10 also includes a first thrust bearing 36 disposed between the first tip 22 and the second portion 34. The first thrust bearing 36 limits movement of the motor shaft 18 along the first axis 20 in a first axial direction 38.

The first thrust bearing 36 engages the first tip 22 at a bearing surface 80 and can be engaged with the second portion 34 in any manner known in the art. For example, the first thrust bearing 36 can be connected to the second portion 34 with fasteners, adhesive, snap-fit or any other permanent or releasable connection method known in the art.

The first portion 32 defines a blind aperture 82 that receives a cylindrically shaped portion of the first end 14. In alternative embodiments of the invention, the first portion 32 could includes bosses to locate the first end 14 or could define indicia to locate the first end 14.

The worm gear 26 rotates to drive one or more gears, such as gears 74, 76, 78 of a vehicle climate control system. The gears 74, 76, 78 are disposed in the housing 28 with the electric motor 12. Interaction between the worm gear 26 and the gears 74, 76, 78 urges the motor shaft 18 to move along the axis 18.

A second thrust bearing 40 is disposed adjacent to the second tip 24 along the first axis 20. The second thrust bearing 40 limits movement of the motor shaft 18 along the first axis 20 in a second axial direction 42 opposite the first axial direction 38. The motor shaft 18 is urged to move in the first axial direction 38 in response to rotation of the worm gear 26 in a first angular direction 44. The motor shaft 18 is urged to move in the second axial direction 42 in response to rotation of the worm gear 26 in a second angular direction 46 opposite the first angular direction 44. The motor shaft 18 is moveable along the axis 20. The second tip 24 is spaced from the second thrust bearing 40 during rotation of the motor shaft 18 in the first angular direction 44. Similarly, the first tip 22 is spaced from the first thrust bearing 36 during rotation of the motor shaft 18 in the second angular direction 46.

The engagement between the first tip 22 and the first thrust bearing 36 during rotation in the first angular direction 44 resists rotation of the motor shaft 18 in the first angular direction 44 with a first force of friction. The engagement between the second tip 24 and the second thrust bearing 40 during rotation in the second angular direction 46 resists rotation of the motor shaft 18 in the second angular direction 46 with a second force of friction substantially the same as the first force of friction. The first and second forces of friction correspond to lost torque. The greater either of the first and second forces of friction are, the greater the losses of torque.

The electric motor assembly 10 also includes a third thrust bearing 68 encircling the motor shaft 18 between the first and second tips 22, 24. The third thrust bearing 68 includes a first member 70 fixed to the motor shaft 18 and a second member 72 fixed to the second end 16. The first and second members 70, 72 contact one another in response to axial movement of the motor shaft 18 in the first axial direction along the first axis 20. However, engagement between the first and second members 70, 72 during rotation of the motor shaft 18 in the first angular direction 44 resists rotation of the motor shaft 18 at a third force of friction higher than the first or second force of friction. As result, the torque losses occurring when the first and second members 70, 72 engage one another are higher than any torque losses occurring when the first tip 22 and the first thrust bearing 36 engage one another or when the second tip 24 and the second thrust bearing 40 engage one another. Therefore, the first thrust bearing 36 is positioned such that the first tip 22 and the first thrust bearing 36 engage one another before the first and second members 70, 72 engage one another. The engagement between the first tip 22 and the first thrust bearing 36 prevent engagement between the first and second members 70, 72. Alternative embodiments of the electric motor assembly 10 could be assembled without a third thrust bearing 68.

Figures 2, 2A:
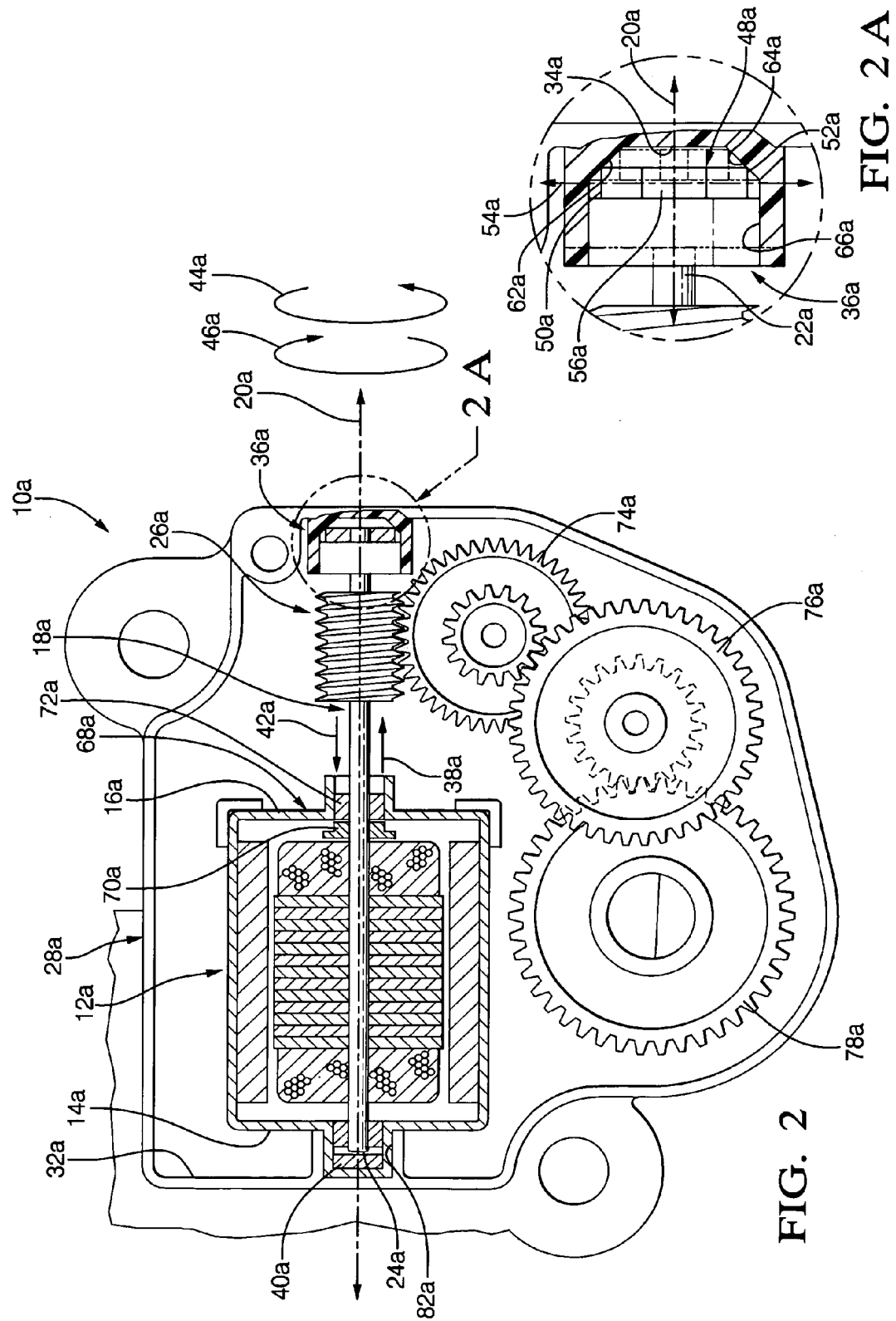
FIG. 2 is a schematic cross-sectional view of a second exemplary embodiment of the invention.
FIG. 2A is a detail view corresponding to detail circle 2A in FIG. 2.

Referring now to FIG. 2, in a second exemplary embodiment of the invention, an electric motor assembly 10a includes an electric motor 12a having a first end 14a and a second end 16a spaced from the first end 14a. The electric motor 12a also includes a motor shaft 18a extending along a first axis 20a between a first tip 22a cantilevered from the second end 16a and a second tip 24a spaced from the first tip 22a along the first axis 20a. A worm gear 26a is disposed on the motor shaft 18a between the second end 16a and the first tip 22a for rotation with the motor shaft 18a about the first axis 20a. The electric motor assembly 10a also includes a housing 28a having an internal surface 30a with a first portion 32a correspondingly shaped with respect to the first end 14a to locate the electric motor 12a in the housing 28a and also having a second portion 34a disposed along the first axis 20a spaced from the first tip 22a. The first portion 32a defines a blind aperture 82a that receives a cylindrically shaped portion of the first end 14a. The electric motor assembly 10a also includes a first thrust bearing 36a disposed between the first tip 22a and the second portion 34a. The first thrust bearing 36a limits movement of the motor shaft 18a along the first axis 20a in a first axial direction 38a.

The worm gear 26a rotates to drive one or more gears, such as gears 74a, 76a, 78a of a vehicle climate control system. The gears 74a, 76a, 78a are disposed in the housing 28a with the electric motor 12a. Interaction between the worm gear 26a and the gears 74a, 76a, 78a urges the motor shaft 18a to move along the axis 18a.

A second thrust bearing 40a is disposed adjacent to the second tip 24a along the first axis 20a. The second thrust bearing 40a limits movement of the motor shaft 18a along the first axis 20a in a second axial direction 42a opposite the first axial direction 38a. The motor shaft 18a is urged to move in the first axial direction 38a in response to rotation of the worm gear 26a in a first angular direction 44a. The motor shaft 18a is urged to move in the second axial direction 42a in response to rotation of the worm gear 26a in a second angular direction 46a opposite the first angular direction 44a.

The engagement between the first tip 22a and the first thrust bearing 36a during rotation in the first angular direction 44a resists rotation of the motor shaft 18a in the first angular direction 44a with a first force of friction. The engagement between the second tip 24a and the second thrust bearing 40a during rotation in the second angular direction 46a resists rotation of the motor shaft 18a in the second angular direction 46a with a second force of friction substantially the same as the first force of friction. The first and second forces of friction correspond to lost torque. The greater either of the first and second forces of friction are, the greater the losses of torque.

Figure 3:
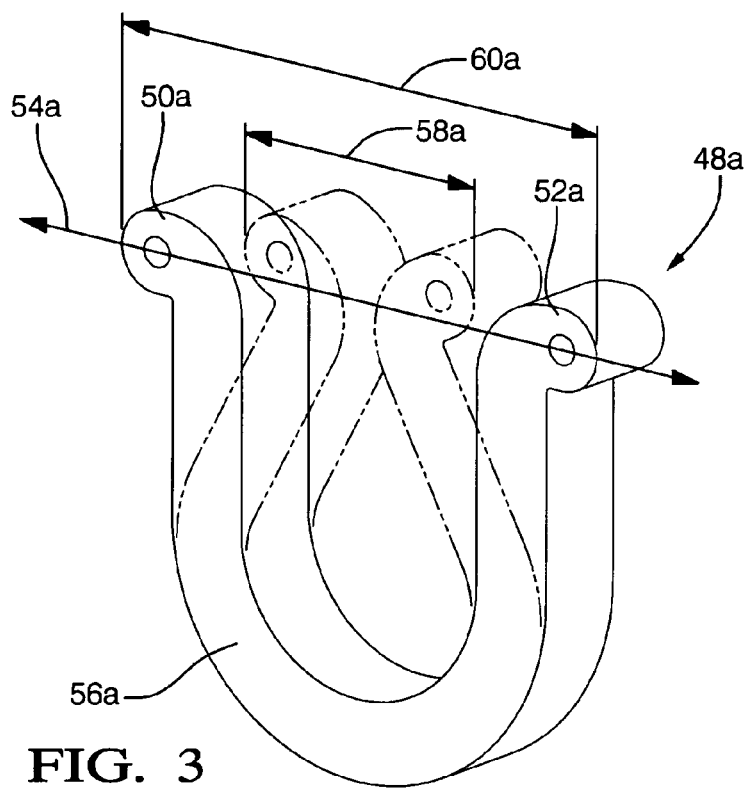
FIG. 3 is a perspective view of a biasing device of the second exemplary embodiment of the invention.

Referring now to FIGS. 2, 2A and 3, the second exemplary embodiment of the invention includes a biasing device 48a urging the thrust bearing toward the first tip 22a. The biasing device 48a includes a first cam follower surface 50a and a second cam follower surface 52a separated from the first cam follower surface 50a along a second axis 54a. The first and second cam follower surfaces 50a, 52a are defined by first and second corners, respectively. The biasing device 48a also includes a resilient body 56a disposed between the first and second cam follower surfaces 50a, 52a. The resilient body 56a is deformable to a first configuration (shown in phantom) wherein the first and second cam follower surfaces 50a, 52a are disposed a first distance 58a from one another along the second axis 54a. The resilient body 56a is operable to at least partially recover from the first configuration to a second configuration (shown in solid line) wherein the first and second cam follower surfaces 50a, 52a are disposed a second distance 60a from one another along the second axis 54a greater than the first distance 58a. The second axis 54a is transverse to the first axis 20a of the motor shaft 18a.

The second portion 34a includes a first stationary cam surface 62a extending transverse with respect to the first axis 20a and a second stationary cam surface 64a extending transverse with respect to the first axis 20a. The first and second stationary cam surfaces 62a, 64a mirror one another about the first axis 20a. The first cam follower surface 50a engages the first stationary cam surface 62a and slides along the first stationary cam surface 62a during recovery of the resilient body 56a from the first configuration to the second configuration. The second cam follower surface 52a engages the second stationary cam surface 64a and slides along the second stationary cam surface 64a during recovery of the resilient body 56a from the first configuration to the second configuration.

The second portion 34a includes a first stationary cam surface 62a extending acutely with respect to the first axis 20a and a second stationary cam surface 64a extending acutely with respect to the first axis 20a. The first and second stationary cam surfaces 62a, 64a mirror one another about the first axis 20a. The first cam follower surface 50a engages the first stationary cam surface 62a and slides along the first stationary cam surface 62a during recovery of the resilient body 56a from the first configuration to the second configuration. The second cam follower surface 52a engages the second stationary cam surface 64a and slides along the second stationary cam surface 64a during recovery of the resilient body 56a from the first configuration to the second configuration. The second portion 34a also includes an aperture 66a receiving the thrust bearing and guiding movement of the thrust bearing along the first axis 20a. The aperture 66a communicates with the first and second stationary cam surfaces 62a, 64a. As a result of the cooperation between the first and second cam follower surfaces 50a, 52a with the first and second stationary cam surfaces 62a, 64a, the biasing device 48a moves along the first axis 20a toward the first tip 22a during recovery of the resilient body 56a from the first configuration to the second configuration.

Figure 4:
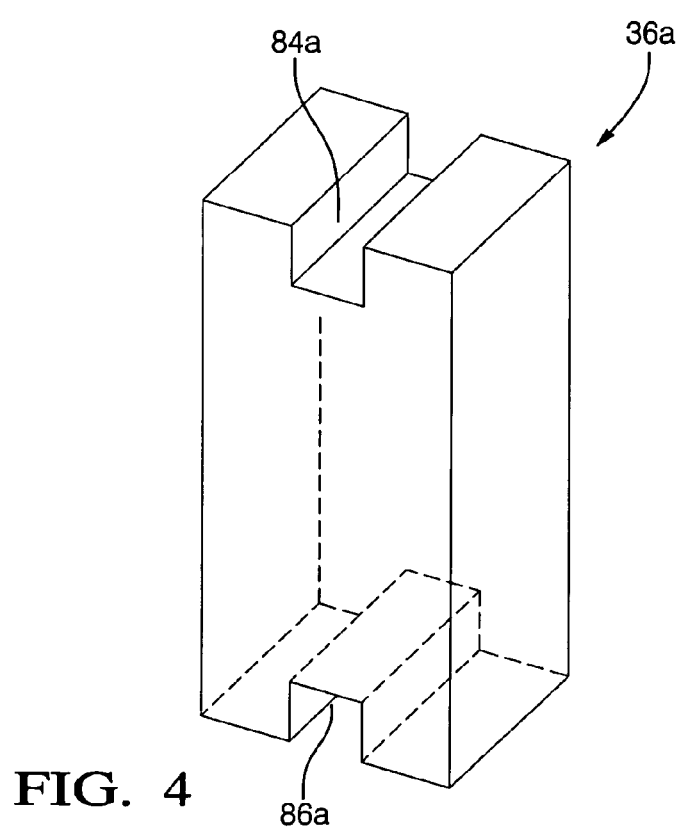
FIG. 4 is a perspective view of a thrust bearing of the second exemplary embodiment of the invention.

FIG. 4 is a perspective view of the first thrust bearing 36a. The first thrust bearing 36a includes a pair of slots 84a, 86a. The slots 84a, 86a cooperate with tongues (not shown) formed in the aperture 66a to guide movement of the first thrust bearing 36a along the axis 18a.

The cooperation between the exemplary biasing device and the exemplary first portion 34a results in the first thrust bearing 36a being relatively lightly urged in the first axial direction 38a (against the first tip 22a) and the first thrust bearing 36a being relatively strongly urged against movement in the second axial direction 42a. With respect to the first thrust bearing 36a being relatively lightly urged in the first axial direction 38a, the biasing device 48 and the first portion 34a cooperate to easily locate the first thrust bearing 36a to contact the first tip 22a during initial assembly. The resilient body 56a recovers until the first thrust bearing 36a to contact the first tip 22a contact one another. If, during operation, the motor shaft 18 moves in the second axial direction 42a, separating the first thrust bearing 36a and the first tip 22a, the resilient body 56a can recover further to move the first thrust bearing 36a further in the second axial direction 42a. However, the cooperation between the biasing device 48 and first portion 34a does not result in a relatively strong force in the first axial direction 38a, which would increase friction between the first tip 22a and the first thrust bearing 36a and associated torque losses. On the other hand, the cooperation between the corners defined by the first and second cam follower surfaces 50a, 52a and the first and second stationary cam surfaces 62a, 64a relatively greatly resists movement of the first thrust bearing 36a in the first axial direction 38a. The corners of the first and second cam follower surfaces 50a, 52a must be driven along the sloped first and second stationary cam surfaces 62a, 64a to deform the resilient body 56a and move the first thrust bearing 36a. As result, the resistance to movement of the first thrust bearing 36a in the first axial direction 38a substantially decreases the likelihood that greater than first and second members 70a, 72a of a third thrust bearing 68a will engage one another.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric motor assembly comprising:
   an electric motor having a first end and a second end spaced from said first end and a motor shaft extending along a first axis between a first tip cantilevered from said second end and a second tip spaced from said first tip along said first axis;
   a worm gear disposed on said motor shaft between said second end and said first tip for rotation with said motor shaft about said first axis;
   a housing having an internal surface with a first portion correspondingly shaped with respect to said first end to locate said electric motor in said housing and also having a second portion disposed along said first axis spaced from said first tip;
   a first thrust bearing disposed between said first tip and said second portion and limiting movement of said motor shaft along said first axis in a first axial direction; and
   a second thrust bearing disposed adjacent said second tip along said first axis and limiting movement of said motor shaft along said first axis in a second axial direction opposite said first axial direction wherein said motor shaft being urged to move in said first axial direction in response to rotation of said worm gear in a first angular direction and being urged to move in said second axial direction in response to rotation of said worm gear in a second angular direction opposite said first angular direction;
   wherein engagement between said first tip and said first thrust bearing during rotation in said first angular direction resists rotation of said motor shaft in said first angular direction with a first force of friction and wherein engagement between said second tip and said second thrust bearing during rotation in said second angular direction resists rotation of said motor shaft in said second angular direction with a second force of friction substantially the same as said first force of friction; and
   wherein said second tip is spaced from said second thrust bearing during rotation of said motor shaft in said first angular direction.

2. The electric motor assembly of claim 1 further comprising:
   a biasing device urging said first thrust bearing toward said first tip.

3. An electric motor assembly comprising:
   an electric motor having a first end and a second end spaced from said first end and a motor shaft extending along a first axis between a first tip cantilevered from said second end and a second tip spaced from said first tip along said first axis;
   a worm gear disposed on said motor shaft between said second end and said first tip for rotation with said motor shaft about said first axis;
   a housing having an internal surface with a first portion correspondingly shaped with respect to said first end to locate said electric motor in said housing and also having a second portion disposed along said first axis spaced from said first tip;
   a first thrust bearing disposed between said first tip and said second portion and limiting movement of said motor shaft along said first axis in a first axial directionl;

a second thrust bearing disposed adjacent said second tip along said first axis and limiting movement of said motor shaft along said first axis in a second axial direction opposite said first axial direction wherein said motor shaft being urged to move in said first axial direction in response to rotation of said worm gear in a first angular direction and being urged to move in said second axial direction in response to rotation of said worm gear in a second angular direction opposite said first angular direction; and a biasing device urging said first thrust bearing toward said first tip wherein engagement between said first tip and said first thrust bearing during rotation in said first angular direction resists rotation of said motor shaft in said first angular direction with a first force of friction and wherein engagement between said second tip and said second thrust bearing during rotation in said second angular direction resists rotation of said motor shaft in said second angular direction with a second force of friction substantially the same as said first force of friction; and wherein said biasing device includes a first cam follower surface and a second cam follower surface separated from said first cam follower surface along a second axis and a resilient body disposed between said first and second cam follower surfaces wherein said resilient body is deformable to a first configuration wherein said first and second cam follower surfaces are disposed a first distance from one another along said second axis and said resilient body is operable to at least partially recover from said first configuration to a second configuration wherein said first and second cam follower surfaces are disposed a second distance from one another along said second axis greater than said first distance and wherein said second axis is transverse to said first axis of said motor shaft.

4. The electric motor assembly of claim 3 wherein said second portion includes a first stationary cam surface extending acutely with respect to said first axis and a second stationary cam surface extending acutely with respect to said first axis and mirroring said first stationary cam surface about said first axis, wherein said first cam follower surface engages said first stationary cam surface and slides along said first stationary cam surface during recovery of said resilient body from said first configuration to said second configuration and wherein said second cam follower surface engages said second stationary cam surface and slides along said second stationary cam surface during recovery of said resilient body from said first configuration to said second configuration.

5. The electric motor assembly of claim 4 wherein said biasing device moves along said first axis toward said first tip during recovery of said resilient body from said first configuration to said second configuration.

6. The electric motor assembly of claim 5 wherein said first and second cam follower surfaces are defined by first and second corners, respectively.

7. The electric motor assembly of claim 6 wherein said second portion further comprises:

an aperture receiving said thrust bearing and guiding movement of said thrust bearing along said first axis.

8. The electric motor assembly of claim 7 wherein said aperture communicates with said first and second stationary cam surfaces.

9. An electric motor assembly comprising:

an electric motor having a first end and a second end spaced from said first end and a motor shaft extending along a first axis between a first tip cantilevered from said second end and a second tip spaced from said first tip along said first axis;

a worm gear disposed on said motor shaft between said second end and said first tip for rotation with said motor shaft about said first axis;

a housing having an internal surface with a first portion correspondingly shaped with respect to said first end to locate said electric motor in said housing and also having a second portion disposed along said first axis spaced from said first tip;

a first thrust bearing disposed between said first tip and said second portion and limiting movement of said motor shaft along said first axis in a first axial direction; and a second thrust bearing disposed adjacent said second tip along said first axis and limiting movement of said motor shaft along said first axis in a second axial direction opposite said first axial direction wherein said motor shaft being urged to move in said first axial direction in response to rotation of said worm gear in a first angular direction and being urged to move in said second axial direction in response to rotation of said worm gear in a second angular direction opposite said first angular direction; and a third thrust bearing encircling said motor shaft between said first and second tips;

wherein engagement between said first tip and said first thrust bearing during rotation in said first angular direction resists rotation of said motor shaft in said first angular direction with a first force of friction and wherein engagement between said second tip and said second thrust bearing during rotation in said second angular direction resists rotation of said motor shaft in said second angular direction with a second force of friction substantially the same as said first force of friction.

10. The electric motor assembly of claim 9 wherein said third thrust bearing includes a first member fixed to said motor shaft and a second member fixed to said second end wherein said first and second members contact one another in response to axial movement of said motor shaft in the first axial direction along said first axis.

11. The electric motor assembly of claim 10 wherein engagement between said first tip and said first thrust bearing prevent said first and second members from contacting one another.

* * * * *